United States Patent [19]

Matthews et al.

[11] Patent Number: 5,198,300
[45] Date of Patent: Mar. 30, 1993

[54] HEAT BOND SEAMING TAPE

[76] Inventors: James Matthews, 1532½ Woodland NW., Canton, Ohio 44703; Nicholas H. Shaheen, Jr., 7644 Onyx Ave., NW., Massillon, Ohio 44646

[21] Appl. No.: 742,400

[22] Filed: Aug. 8, 1991

Related U.S. Application Data

[63] Continuation-in-part of Ser. No. 611,985, Nov. 13, 1990, abandoned.

[51] Int. Cl.[5] .................. B32B 7/12; B32B 15/02
[52] U.S. Cl. ...................... 428/354; 428/57; 428/58; 428/62; 428/247; 428/255; 428/343; 156/304.4; 156/304.6; 156/304.7
[58] Field of Search .............. 428/62, 102, 247, 255, 428/354, 57, 58, 343; 156/304.4, 304.6, 304.7

[56] References Cited

U.S. PATENT DOCUMENTS

| | | | |
|---|---|---|---|
| 3,877,959 | 4/1975 | Weiss | 428/156 X |
| 3,972,768 | 8/1976 | Hill | 428/122 X |
| 4,234,649 | 11/1980 | Ward | 428/255 |
| 4,416,713 | 11/1983 | Brooks | 156/64 |
| 4,483,896 | 11/1984 | Gray et al. | 428/200 |
| 4,565,728 | 1/1986 | Gray et al. | 428/200 |
| 4,610,906 | 9/1986 | Brooks | 428/102 |
| 4,749,433 | 6/1988 | Johnson et al. | 156/304.4 |
| 4,824,498 | 4/1989 | Goodwin et al. | 156/71 |
| 4,919,743 | 4/1990 | Johnston et al. | 156/304.4 |
| 4,935,280 | 6/1990 | Gangi | 428/102 |
| 5,003,664 | 4/1991 | Wong | 428/62 X |

FOREIGN PATENT DOCUMENTS 1282418 7/1972 United Kingdom ............. 428/62

Primary Examiner—George F. Lesmes
Assistant Examiner—D. R. Zirker
Attorney, Agent, or Firm—Michael Sand Co.

[57] ABSTRACT

A heat bond seaming tape has a base formed of a strip of paper or paper-like material. A strip of an open mesh material is adhered to the base strip and is disposed in substantially symmetrical, overlying relation thereto. A plurality of spaced, transversely disposed, rigid bracing members are sandwiched between the mesh strip and base strip or in the alternative are secured on top of the mesh strip. A thermoplastic adhesive overlies the open mesh strip and the bracing members for adhering the strip and bracing members to the backs of adjacent carpet edges, so that a seam defined by said adjacent carpet edges, will lie flat in response to the provision of said seam tape, due to the rigid bracing members extending generally transversely across the carpet seam.

10 Claims, 4 Drawing Sheets

HEAT BOND SEAMING TAPE

CROSS REFERENCE TO RELATED APPLICATION

This application is a continuation-in-part of application Ser. No. 07/611,985 filed Nov. 13, 1990, now abandoned.

BACKGROUND OF THE INVENTION

1. Technical Field

This invention relates generally to seam tape, and more specifically relates to a seam tape having rigid brace members disposed transversely to the longitudinal axis of the tape to thereby reinforce the tape, and hence carpet seams, against buckling.

2. Background Information

A longstanding problem in the carpet laying service is the tendency of adjoining carpets to rise along the length of their common seam. This unsightly buckling is caused by the stresses appearing at the seam, and is a source of frequent consumer complaints.

The most widely used means for attempting to retain the abutting carpet edges in a flat disposition is the well-known heat bond seam tape. The tape is a composite structure of three primary elements. Essentially, an open mesh reinforcing means, or webbing, is held in sandwiched relation between a strip of paper and a strip of thermoplastic adhesive. The purpose of the tape is to secure the seam, i.e., to prevent the seam from separating responsive to oppositely directed stretching forces imparted to the abutting carpets. It is the weakness of the open mesh, or webbing, which allows the carpets to buckle, or lift, at the seam.

Another drawback of prior art hot melt seaming tape is the tendency for the webbing to separate from the paper upon which it is adhesively mounted when the heat seaming iron is used to melt the layer of thermoplastic adhesive. This phenomenon, known in the trade as web drag, severely weakens the tape and contributes to the lifting of the adjoining carpets at the seam.

A further seaming tape of the prior art is known as pin tape, and includes a plurality of metallic bracing members disposed in sandwiched relation to the paper base and the webbing. The braces have upstanding teeth with which to grab the carpet backing.

U.S. Pat. No. 4,935,280 discloses a prior art seaming tape having reinforcing filaments of high-strength yarn such as fiberglass, synthetic fibers or metal wire woven into the mesh backing of the tape. U.S. Pat. No. 4,565,728 also discloses another type of seaming tape having metal wires embedded therein for heating in order to melt the adjacent adhesive, as well as reinforcing cords of fiberglass or the like. U.S. Pat. No. 4,416,713 shows another prior art carpet seaming tape which includes reinforcing filaments formed of rayon or glass fibers which extend transversely across the width of the tapes.

Although prior art carpet seaming tapes such as those discussed above all contain reinforcements, they are in fiber form. Although such fibers may provide reinforcing to the mesh, it does not provide the required reinforcement to prevent buckling or uplifting of the carpet edges at a seam.

There is a need in the carpet laying service for a seaming tape that provides lift-free seams and that is free of web drag problems, but the prior art shows no such tape.

SUMMARY OF THE INVENTION

The longstanding but heretofore unfulfilled need for such a seaming tape is now provided in the form of a tape having a plurality of preferably metallic, toothless bracing members disposed transversely of and in overlying or underlying relation to the webbing of the tape. Such bracing members provide sufficient rigidity to retain the seam against buckling and, in combination with an adhesive, prevent separation of the webbing from the base paper.

It is therefore seen to be the primary object of this invention to provide a seaming tape that eliminates the lifting of abutting carpets at the seam that occurs when prior art seaming tapes are used.

A closely related object is to provide such a seaming tape that eliminates web drag.

It is another object of the invention to provide a seaming tape having a removably mounted base sheet so as to reduce the thickness of the seaming tape after being bonded to the backing of adjacent carpets along the seam thereof by providing an adhesive release coating on the base sheet.

The invention accordingly comprises the features of construction, combination of elements, and arrangement of parts that will be exemplified in the construction hereinafter set forth, and the scope of the invention will be indicated in the claims.

These objectives and advantages obtained by the improved seaming tape of the invention which is used for connecting and joining edges of carpet at a seam, the general nature of which may be stated as including a base strip of flexible sheet material; a strip of open mesh material having a longitudinal axis and secured in an overlying relationship to the base sheet; a plurality of longitudinally spaced rigid flat base members sandwiched between the mesh material and base strip and extending across the longitudinal axis of said mesh materials; and a thermoplastic adhesive material overlying the mesh material and brace members for bonding said mesh material to a backing of the carpet with the longitudinal axis of the mesh material generally aligning with the seam of the carpet whereby the brace members extend across said seam to reduce buckling at the seam.

BRIEF DESCRIPTION OF THE DRAWINGS

For a fuller understanding of the nature and objects of the invention, reference should be made to the following detailed description taken in connection with the accompanying drawings, in which.

Similar numerals refer to similar parts throughout the drawings.

DESCRIPTION OF THE PREFERRED EMBODIMENT

Figure 1:
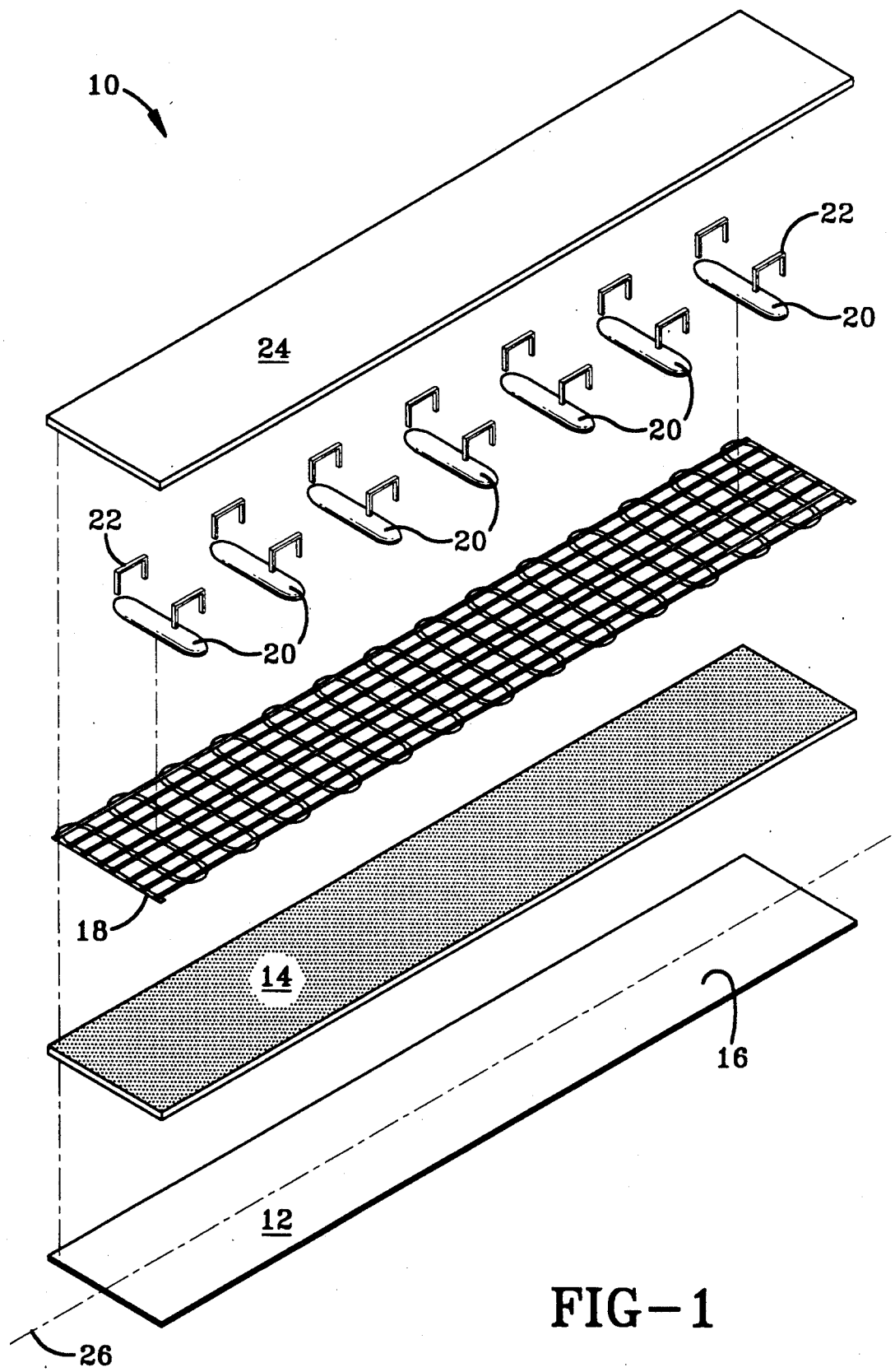
FIG. 1 is an exploded, perspective view of an embodiment which illustrates the invention.

Referring now to FIG. 1, it will there be seen that a composite structure that is illustrative of the invention is generally designated 10.

As in conventional heat bond seaming tapes, the base means 12 for the tape is an elongate, flexible material such as crepe paper or various types of lightweight paper, or could be formed of other materials such as cloths, plastic or the like currently used for many seaming tape constructions. In the preferred embodiment, the tape will have a width of approximately 3½ inches.

A thin layer of thermosetting thermoplastic adhesive 14 of the tape readily used in the carpet seaming art, an example of which is set forth in U.S. Pat. No. 4,416,713, is applied to the operative surface 16 of the base means 12 to secure the webbing 18 thereto. As clearly shown, the webbing 18 is an open mesh material formed of fiberglass, nylon, polyester or other types of synthetic fibers well known for the construction of such mesh materials in the carpet seaming art. Just as in conventional seaming tapes, it is the function of the webbing 18 to keep the carpet seam 19 (FIG. 2) from separating when the carpet is stretched. Although such webbing, in conventional types, usually provides its intended function, it does so at the cost of the peaking, or lifting, at the seams that is often apparent when conventional tapes are used. Such buckling occurs because the webbing is flexible and responds to laterally directed forces—such forces being generated by carpet stretching—by buckling along its longitudinal axis of symmetry.

Figure 2:
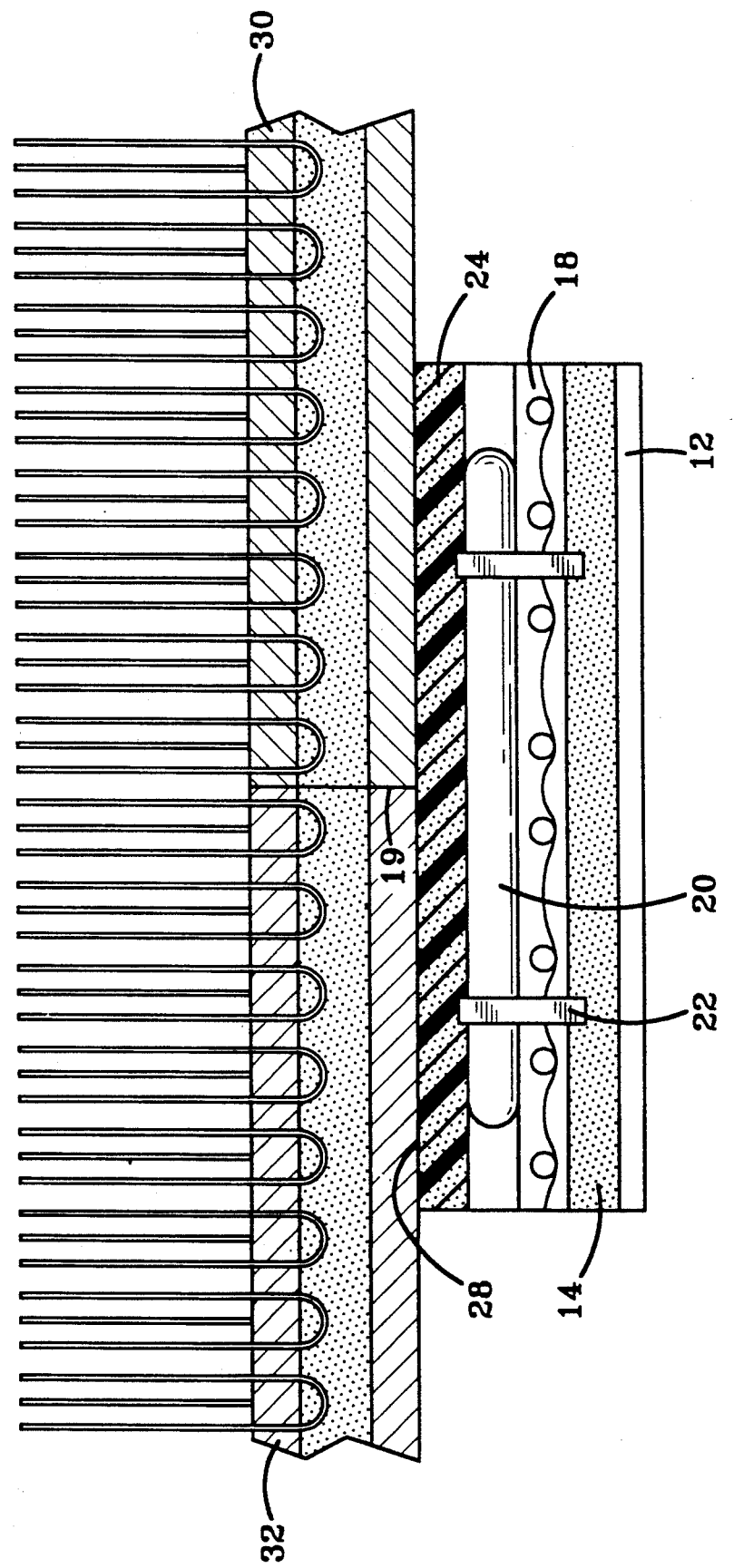
FIG. 2 is an enlarged fragmentary sectional view of the seaming tape placed along the seam on the backing of two adjacent sections of carpeting before being heat sealed thereto.

The peaking problem, and the web drag problem as well, are overcome by providing a plurality of brace members, collectively designated 20, disposed in overlying relation to the webbing 18, transversely thereof in the embodiment shown in FIGS. 1 and 2. The braces 20 are shown in substantially parallel, equidistantly spaced relation to one another, as such arrangement is believed to be optimal. However, the brace members 20 could be disposed in mutually oblique, non-equidistantly spaced relation to one another and still provide a tape having anti-peaking properties superior to the tapes of the prior art.

Figure 3:
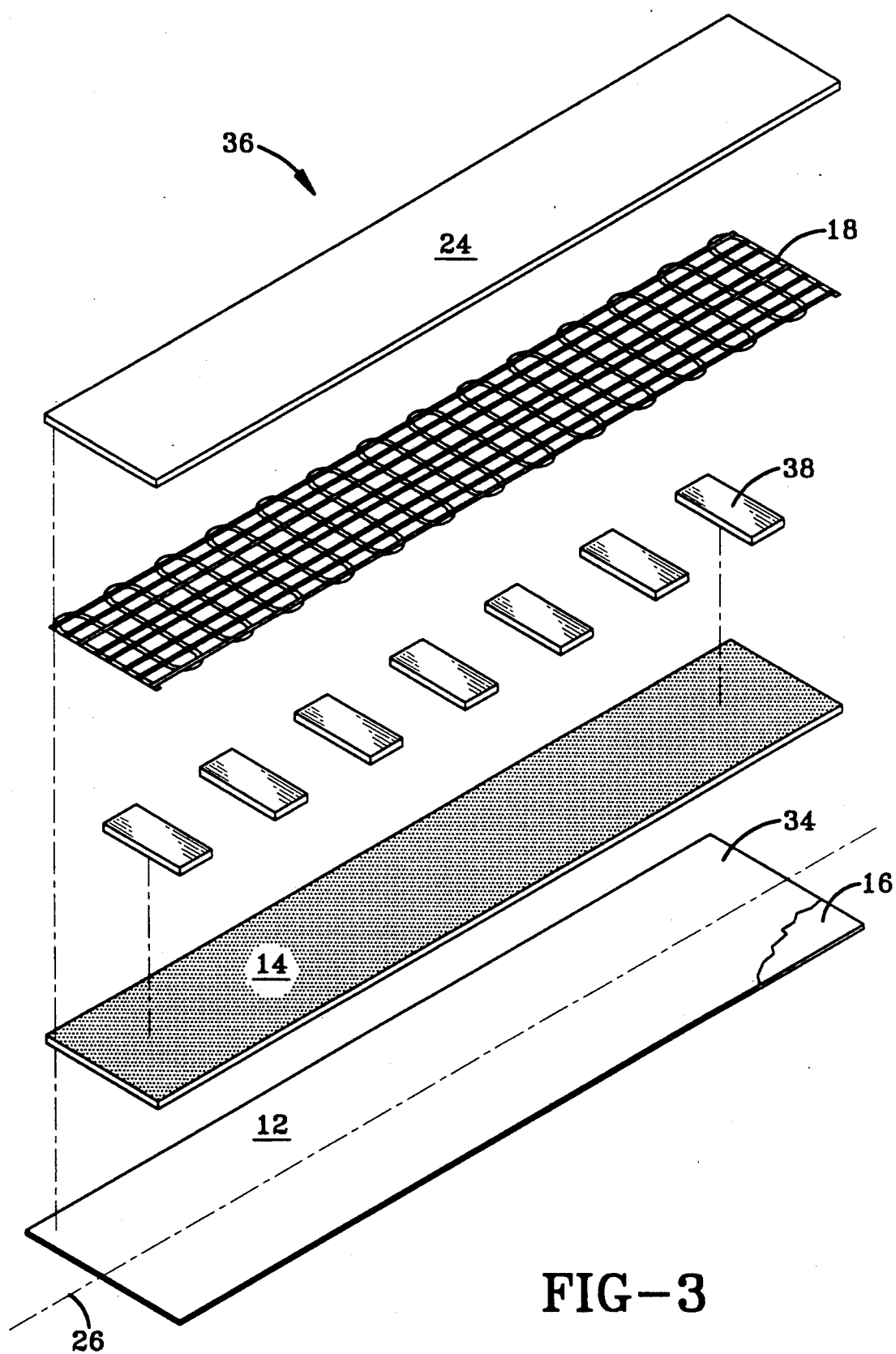
FIG. 3 is an exploded perspective view of another embodiment of the seaming tape of the invention.

Braces 20 preferably are formed of a rigid metal such as strap steel having a gauge range of from 0.020 to 0.040 inches with the preferred range being between 0.025 and 0.031 inches. The braces may be oval-shaped as shown in FIG. 1 or may be rectangular-shaped as shown in FIG. 3, and have a length within the range of between 1¼ inches and 2½ inches with the preferred size being approximately 1⅜ inches. The brace members have a width within the range of between ½ inch and 1¼ inches with the preferred width being ⅝ inch. However, these dimensions can vary somewhat without effecting the invention. Although metal, such as the strap steel, as set forth above is the preferred material of braces 20, other types of sufficiently thin and rigid materials, such as various types of high-strength plastics or the like, could be used although metal has proved to be most satisfactory.

Suitable fastening means, such as staples 22 or various types of contact or latex adhesive, are employed to secure the brace members 20 to the base means 12. As shown, the webbing 18 is disposed in sandwiched relation between the bracing members 20 and the base means 12 in the embodiment of FIGS. 1 and 2. As set forth above, the individual brace members 20 preferably are metallic in composition and have no teeth. Accordingly, members 20 do not serve the same function as the tooth-carrying brace members (not shown) of the prior art, which tooth-carrying brace members are themselves disposed in sandwiched relation between the webbing and the base means. However, these prior brace members do not serve to prevent web drag, nor do they contain thermoplastic adhesives. Likewise, these prior art braces are used on a tape which uses a water based liquid latex which is poured onto the backing papers and webbing and require a curing time of approximately 24 hours and does not use a seaming iron. These prior brace members are designed only to hold the carpet together until the latex adhesive has dried and not to prevent buckling.

A layer of conventional thermoplastic adhesive means 24 of the tape well known in the carpet seaming art and presently used in other carpet seaming tapes, is applied in overlying relation to the webbing 18 and to the braces 20, to complete the novel seaming tape. As in conventional tapes, the novel tape is placed in underlying relation to the seam to be formed, with the longitudinal axis of symmetry 26 of the tape 10 lying in substantial registration with the seam to be formed so that the stresses appearing at the seam will be evenly distributed throughout the tape 10. A usual heat seaming iron, not shown, is employed to melt the thermoplastic adhesive 24 in a conventional manner so that a bond can be established between the adhesive 24 and the respective backings 28 of the abutting carpets 30 and 32 so that when the adhesive 24 rehardens, the abutting carpet edges will bond with the adhesive 24 and hence with each other. Web drag is prevented by the braces 20 which prevent the webbing 18 from lifting as the iron travels the length of the tape.

The steel brace members 20 successfully resist peaking at the seams, even when the seam is subjected to substantial stressing. Also, by preventing separation of the webbing 18 and the base means 12, the brace members 20 maintain the structural integrity of the novel tape 10.

In a slightly modified form of the invention (FIG. 3), surface 16 of base sheet 12 preferably is coated with a silicone coating 34 whereby sheet 12 is easily removable from the remaining components of the seaming tape and in particular from adhesive 14, after the tape has been bonded to the carpet backings along seam 19. The silicone coating is of a type of adhesive release material well known in the art, and will enable base sheet 12 to be easily peeled from the bonded adhesive 14 and webbing 18 after webbing 18 and brace members 20 are heat sealed to the carpet backing by adhesive 24. This modified structure will be used primarily when seaming tape 10 is used with designer area rugs which will reduce the thickness of the tape after being bonded to the seams by elimination of base sheet 12 in the final assembled joined carpet.

Figure 4:
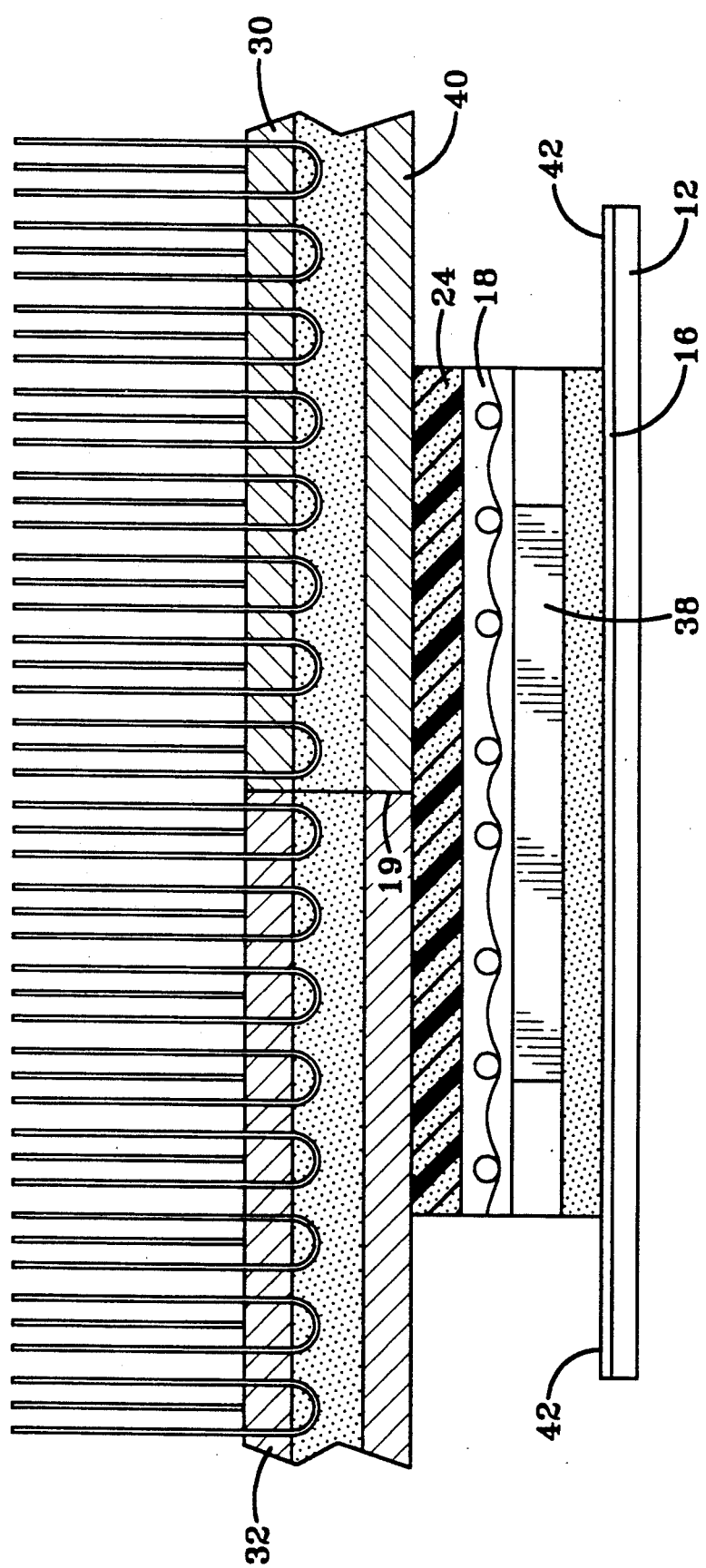
FIG. 4 is a enlarged fragmentary sectional view similar to FIG. 2, showing the seaming tape embodiment of FIG. 3 placed along the seam of two adjacent sections of carpet.

A further modification of the improved seaming tape is shown in FIGS. 3 and 4 and is indicated generally at 36. Tape 36 is similar in most respects to the tape embodiment shown in FIGS. 1 and 2 in that it includes a base sheet or strip 12 which may have a silicone coating 34 thereon to which is applied adhesive layer 14. A plurality of brace members 38 are sandwiched between strip 12 and mesh web 18 and are secured therebetween by adhesive layer 14 eliminating the need for any staples or other types of attachment means. Members 38 serve the same function as members 20 discussed above, except they preferably have the rectangular configuration and characteristics set forth above. A layer of thermoplastic adhesive 24 is then applied over web 18 in order to bond it to the carpet backing 28 as shown in FIG. 4.

In this second embodiment the location of members 38 between web 18 and base sheet 12 eliminates the need of any additional securing means, and thermoplastic adhesive 24, when melted, will bond into the bottom or secondary backing 40 of the adjoining carpet sections 30 and 32. In tape 36, base sheet 12 preferably has a width of approximately 3½ inches with the adhesives and mesh having a width of approximately 2½ inches leaving an uncoated border 42 of approximately ½ inch along each longitudinal edge. Preferably, brace members 38 are spaced equally apart throughout the longitudinal length of the tape generally within the range of between 1 inch and 5 inches, and preferably between the range of between 2 inches and 4 inches. Brace members 20 preferably have a similar spacing.

It will thus be seen that the objects set forth above, and those made apparent by the preceding description, are efficiently attained, and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Accordingly, the improved carpet seaming tape is simplified, provides an effective, safe, inexpensive, and efficient tape which achieves all the enumerated objectives, provides for eliminating difficulties encountered with prior tapes, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved carpet seaming tape is constructed and used, the characteristics of the construction, and the advantageous, new and useful results obtained; the new and useful structures, devices, elements, arrangements, parts and combinations, are set forth in the appended claims.

We claim:

1. A seam tape for connecting adjoining edges of carpet at a seam thereof to reduce buckling of said edges along said seam including:
   a base strip of flexible sheet material;
   a strip of open mesh material having a longitudinal axis secured in an overlying relationship to the base strip;
   a plurality of rigid flat toothless brace members secured to the base strip and spaced along the longitudinal axis of the mesh material, with each of said brace members extending generally transversely across the longitudinal axis of said mesh material;
   means for securing the brace members to the base strip; and
   a thermoplastic adhesive material applied to and overlying the mesh material and brace members for bonding said mesh material and the brace members to a backing of the carpet.

2. The seam tape defined in claim 1 including a release adhesive applied to the base strip for removably bonding the base strip to the open mesh material.

3. The seam tape defined in claim 1 in which the brace members are secured to the mesh material by staples.

4. The seam tape defined in claim 1 in which the brace members are metallic.

5. The seam tape defined in claim 4 in which the brace members have a gauge thickness of between 0.20 and 0.40 inches.

6. The seam tape defined in claim 5 in which the gauge thickness of the brace members is between 0.028 and 0.031 inches.

7. The seam tape defined in claim 1 in which the brace members extend perpendicular to the longitudinal axis of said mesh material.

8. The seam tape defined in claim 1 in which the brace members are spaced apart from each other, between 1 inch and 5 inches.

9. The seam tape defined in claim 1 in which the brace members are metallic having a rectangular configuration with a width of between ½ inch and 1¼ inches, and a length of between 1¼ inches and 2½ inches.

10. The seam tape defined in claim 1 in which the brace members are located between the base strip and mesh material.

* * * * *